Aug. 11, 1959 S. A. CALE 2,898,873
REMOVABLE SCRAPER ASSEMBLY FOR DOUGH SHEETING MACHINE
Filed Oct. 20, 1958 2 Sheets-Sheet 1
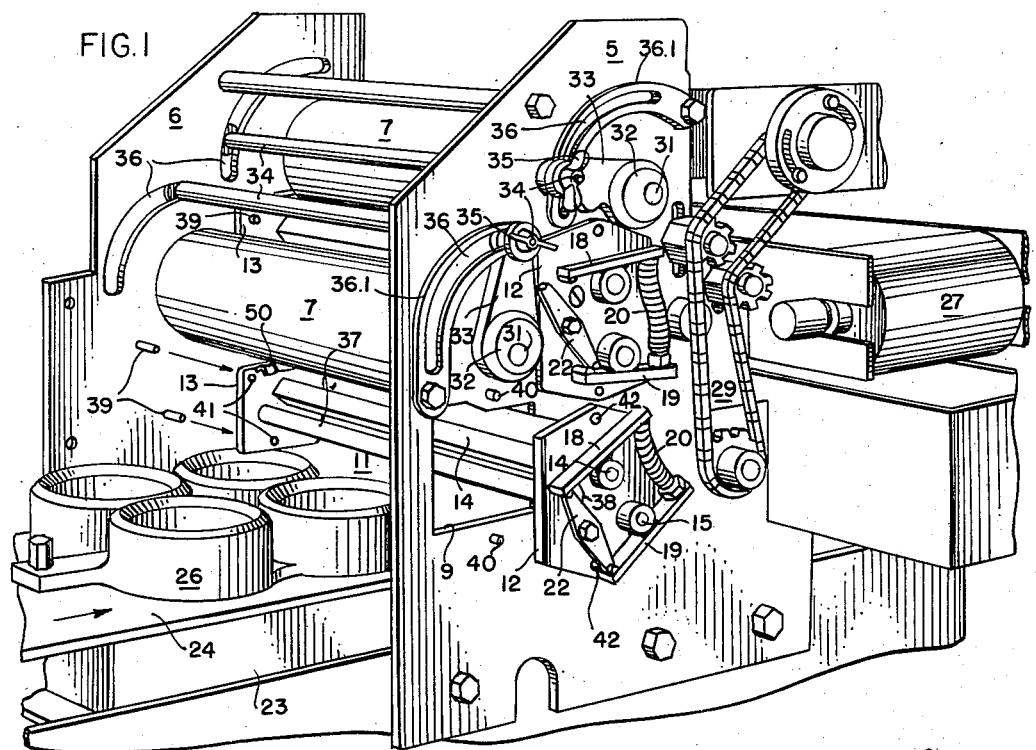
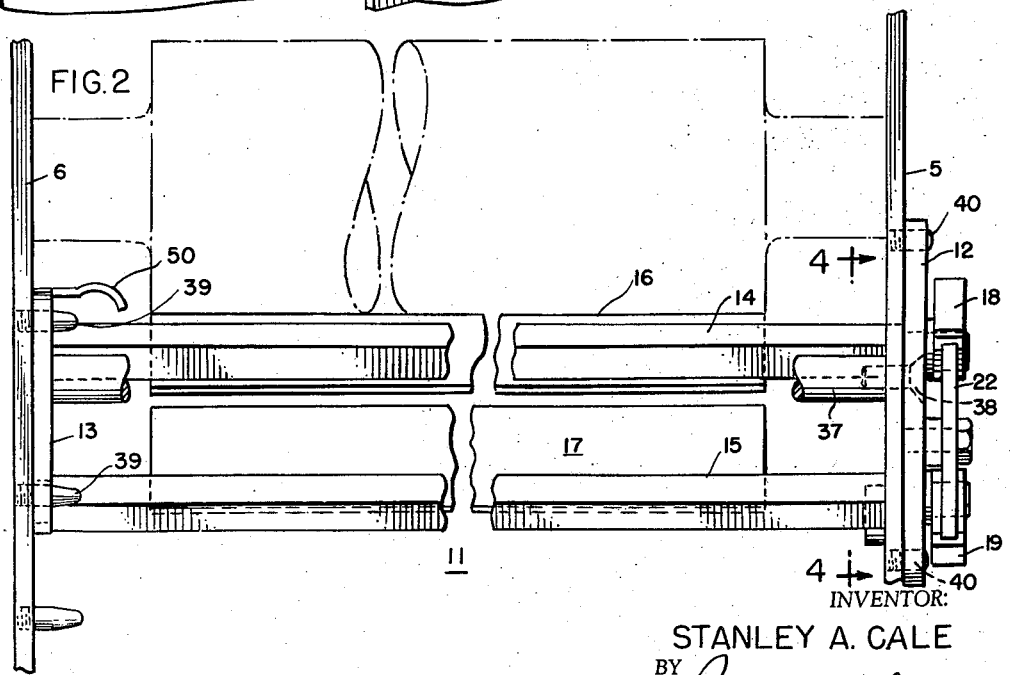
INVENTOR:
STANLEY A. CALE
BY
ATT'YS Aug. 11, 1959 S. A. CALE 2,898,873
REMOVABLE SCRAPER ASSEMBLY FOR DOUGH SHEETING MACHINE
Filed Oct. 20, 1958 2 Sheets-Sheet 2

INVENTOR:
STANLEY A. CALE
BY
ATT'YS

United States Patent Office 2,898,873
Patented Aug. 11, 1959

2,898,873

REMOVABLE SCRAPER ASSEMBLY FOR DOUGH SHEETING MACHINE

Stanley A. Cale, Chicago, Ill., assignor to Colborne Manufacturing Company, Chicago, Ill., a corporation of Illinois Application October 20, 1958, Serial No. 768,450

7 Claims. (Cl. 107—12)

This invention relates to scraper or doctor blade assemblies for dough-sheeting machines, especially machines for making pie crusts.

In practically every type of dough-sheeting machine, the opposed rollers, through which the dough passes, are provided with scrapers positioned in contact with the roller peripheries so as to peel off the sheeted dough for transfer to the next operation. Periodically, during the operation of the sheeting machine, and always when the machine is shut down, these scrapers have to be cleaned of the dough and caked flour which inevitably clings to the surfaces of the blades. In dough-sheeting apparatus currently available and in use, this cleaning of the scrapers has to be accomplished when the scrapers are in their normal operative positions with respect to the rollers from which the sheeted dough is peeled. This makes cleaning of the scrapers difficult and less thorough than could be the case if the scrapers were removed from their positions adjacent the rollers.

The main objects of this invention, therefore, are to provide an improved scraper assembly for dough-sheeting machines; to provide an improved scraper assembly which permits the scrapers to be removed from the machine for cleaning; to provide an improved scraper assembly of this kind having improved means for positively positioning the scrapers in operative relationship to the respective rollers; to provide improved means for retracting the scrapers from their operative relationship with the rollers when the scraper assembly is to be removed to permit cleaning of the scrapers; to provide improved means on the removable scraper assembly for locking the assembly in place on the sheeting machine; and to provide an improved removable scraper assembly of this kind which is simple in construction, hence economical to manufacture, and which is easy to remove from or replace on the machine as occasion may require.

A specific embodiment of this invention is shown in the accompanying drawings in which:

Figure 1 is a perspective view of a pie-dough sheeting machine with removable scraper assemblies constructed in accordance with this invention, one of the scraper assemblies being shown partly removed from its operative position with respect to the rollers;

Fig. 2 is an enlarged, end view of the machine taken from the left of Fig. 1, the upper scraper assembly only being shown and one of the associated rollers being indicated in dotted outline;

Figure 3:
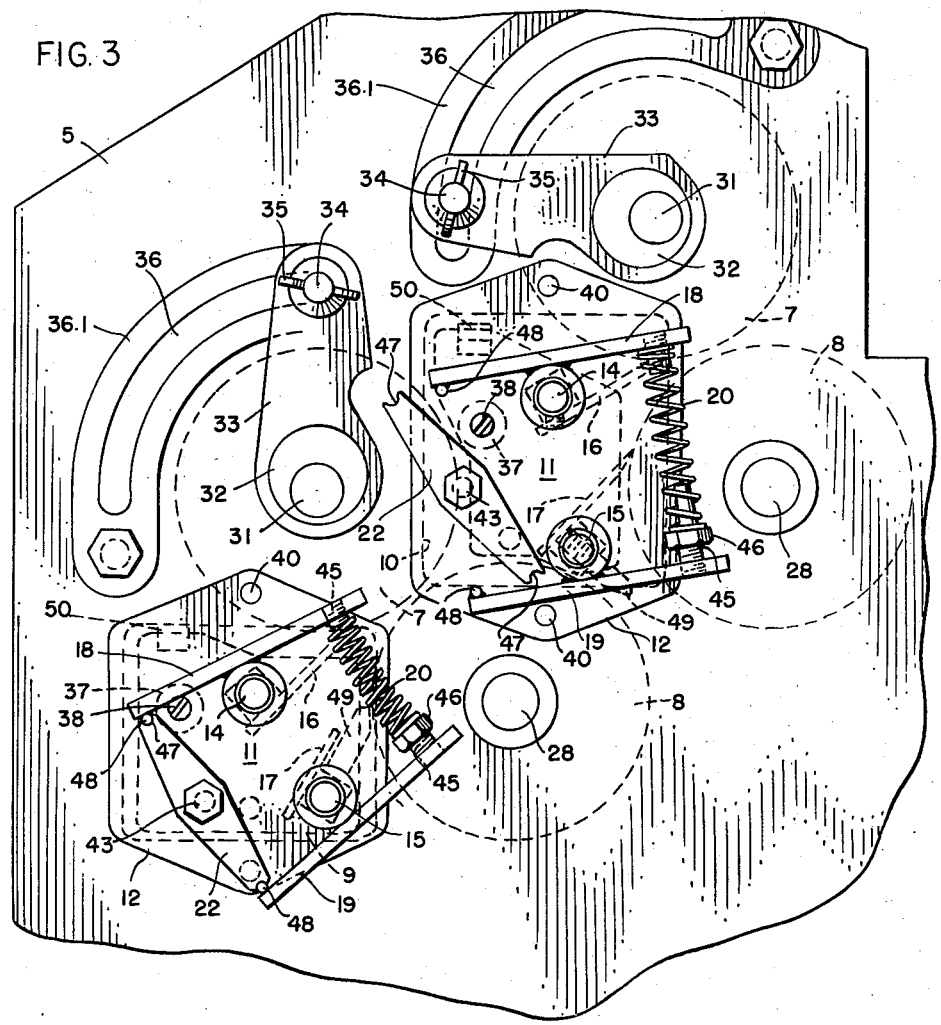
Fig. 3 is a fragmentary side elevation of the machine as shown in Fig. 1.

The essential concept of this invention involves a more or less conventional dough-sheeting machine one side panel of which is modified to provide an opening through which is removably insertable a scraper-assembly wherein the scraper-blade-supporting shafts are actuated by spring-biased rocker arms to operatively press the blades against the sheeting rollers, the shafts being reversibly actuated by a locking bar interposed between the rocker arms to hold the scrapers retracted from the rollers when the assembly is to be withdrawn from the machine to permit cleaning of the scrapers and rollers.

A dough-sheeting machine and removable scraper assembly embodying the foregoing concept, as herein shown, comprises a pair of end panels 5 and 6, journaling pairs of sheeting rollers 7 and 8, one of which end panels has openings 9 and 10 formed therein to allow for the insertion and removal of a pair of scraper assemblies 11, the end plates 12 and 13 of which journal shafts 14 and 15 mounting scraper blades 16 and 17 and rocker arms 18 and 19. The rocker arms 18 and 19, which are on the outer side of the end plate 12, are biased by a spring 20 to press the scrapers 16 and 17 into operative relationship with the respective rollers 7 and 8, the rocker arms 18 and 19 being oppositely shiftable by a spreader bar 22 to retract the scrapers 16 and 17 from the rollers and to permit the removal of the scraper assembly 11 from the sheeting machine.

The dough-sheeting machine, as shown in the accompanying drawings, is one constructed for processing dough for pie crusts. The machine comprises the end panels 5 and 6, journaling two sets of sheeting rollers 7 and 8 and bolted upright to a framework 23, above a conveyor 24 carrying pie-plate holders 26, and adjacent a transversely-moving conveyor 27 which delivers dough pieces to the sheeting rollers 7 and 8 in a known manner not herein shown.

The rollers 7 and 8 of each pair have their shafts 28 and 31 driven by a conventional chain and sprocket mechanism, not shown. The upper roller 7 of each pair has each end of its shaft 31 journaled in a respective eccentric 32, rotatably mounted in the end panels 5 and 6, and each eccentric has a radial arm 33. The outer ends of the arms 33 mount a cross-rod 34 spanning the plates 5 and 6 and slidable in segment slots 36 formed in the panels 5 and 6. The rods 34 are locked in a selected position along the slots 36 by the wing-nuts 35 on the opposite ends of the rods 34, and arcuate bearing plates 36.1 are provided for this purpose. Such positioning of the rollers 7 of each pair predetermines the thickness of the dough sheets discharged from the respective pairs of sheeting rollers 7 and 8.

Two scraper assemblies 11 are shown in the dough-sheeting machine illustrated herein. One such assembly is arranged adjacent each pair of sheeting rollers 7 and 8. As is quite apparent from the drawings, and the foregoing description, these scraper assemblies are identical in structure. Hence, a description of one assembly will suffice.

As shown the end plate 12 is of somewhat hexagonal shape, slightly larger in each dimension than the respective opening 9 or 10 in the end panel 5 of the sheeting machine. Thus the perimetrical portions of the assembly plate 12 overlap the margins which define the opening. The end plate 13 of the assembly here is shown of rectangular form and, obviously, is smaller than the panel opening 9 (or 10) to permit passage of the plate 13 through such opening when the assembly is removed or replaced.

The end plates 12 and 13, of the scraper assembly 11, are held together by a rod 37 secured to each end plate by screws 38 and, of course, also the scraper shafts 14 and 15. Fixed pins 39 on the inner face of the sheeting-machine end-panel 6 and pins 40 on the outer face of the panel 5, registering with apertures 41 and 42 in the plates 13 and 12, support the scraper assembly in operating position and insure correct positioning of the assembly relative to the respective rollers 7 and 8.

The scraper shafts 14 and 15 are of rectangular cross section, with their ends rounded for journaling in the end plates 12 and 13. The scrapers 16 and 17 are of conventional form and are suitably secured to one flat side of the respective shafts 14 and 15 so that the knife edges 21 press properly against the peripheries of the rollers 7 and 8 at an angle that will best assure proper peeling of the dough sheets from the rollers.

The rocker arms 18 and 19 are suitably secured medially of their length, as by welding, to the respective shafts 14 and 15 exteriorly of the plate 12. Thus each arm, 18 and 19, extends radially on opposite sides of its shaft. The spring 20 is interposed between the ends of rocker arms 18 and 19 on one side of the shaft so that they are normally actuated to hold the respective scrapers 16 and 17 firmly against the rollers 7 and 8. The spring 20 sets over studs 45 threaded in the ends of the rocker arms 18 and 19; and an adjusting nut 46, on one of these studs permits tensioning of the spring 20 to insure the desired contact pressure of the scraper edges against the rollers 7 and 8.

The spreader bar 22 is pivoted at 43 to the plate 12 radially opposite the spring 20 and is swingable to bring the ends of the spreader bar 22 into contact with the adjacent opposed ends of the rocker arms 18 and 19. In this way the rocker arms 18 and 19 can be spread so as to counteract the spring 20 and thus rotate the shafts 14 and 15 to retract the scrapers 16 and 17 from contact with the rollers 7 and 8 to permit removal and replacement of the scraper assembly with respect to the rollers 7 and 8. The ends of the bar 22 are notched or recessed at 47 to engage rounded ledges or bosses 48 on the ends of the rocker arms 18 and 19. The seating of the bosses 48 in the recesses 47 insures a retention of the rocker arms 18 and 19 in retracted position against the spring 20.

Figure 4:
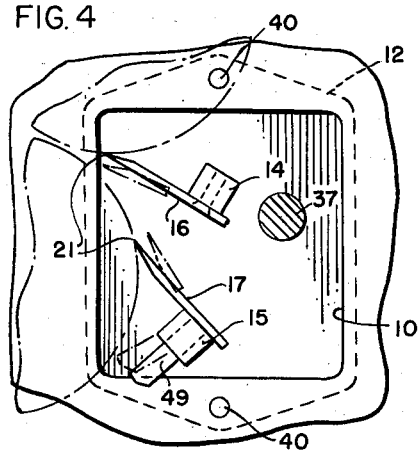
Fig. 4 is a fragmentary detail of the scraper assembly as viewed from the plane of the line 4—4 of Fig. 2.

To insure retention of the scraper assembly 11 in operative position with respect to the rollers 7 and 8, a pawl 49 is secured to the shaft 15 inwardly of the outer plate 12 a distance substantially equal to the thickness of the panel 5. This pawl 49 is so positioned circumferentially on the shaft 15 that when the bar 22 is disengaged from the rocker arms 18 and 19 and the spring 20 activates the rocker arms to engage the blades 16 and 17 with the respective rollers, the free end of the pawl 49 is positioned inwardly of the perimeter of the panel opening 9 (or 10) and the scraper assembly is locked in operative position on the panels 5 and 6. This locking position of the pawl 49 is shown in full lines in Fig. 4. When the bar 22 is shifted, to spread the adjacent ends of the rocker arms 18 and 19 and counteract the spring 20, the pawl 49 is shifted to free the end thereof from behind the margin of the opening 9 (or 10) whereupon the scraper assembly is free to be removed endwise from the panels 5 and 6 of the sheeter apparatus, as shown in Fig. 1.

To facilitate handling of the scraper assembly 11, when removing it from or replacing it on the panels 5 and 6, a finger grip 50 is attached to the upper edge of the inner plate 13 of each scraper assembly (Fig. 2).

When a scraper assembly 11 is ready to be inserted into the opening 9 (or 10) the bar 22 is shifted into position to spread the adjacent ends of the rocker arms 18 and 19. This spreads the arms apart, compresses the spring 20 and rotates the shafts 14 and 15 to retract the scrapers 16 and 17 and the pawl 49 to free them from any contact with the rollers 7 and 8 and the panel 5, respectively, as the assembly is inserted through the opening 9 (or 10). Such a retracted position of the scrapers 16 and 17 and the pawl 49, is indicated in dotted outline in Fig. 4.

As the assembly 11 approaches its operative position between the end walls or panels 5 and 6, the apertures 41 on the plate 13 and the apertures 42 on the plate 12 are alined with the respective pins 39 and 40 so that as the inward movement of the assembly is completed the pins 39 and 40 will enter the apertures 41 and 42 and hold the assembly in operative position with respect to the rollers 7 and 8. When the assembly is so positioned on the pins 39 and 40, the bar 22 is then shifted angularly to disengage the bosses 48 from the recesses 47. This releases the rocker arms 18 and 19 so that the shafts 14 and 15 are rotated by the action of the spring 20 sufficiently to press the scrapers 16 and 17 against the respective rollers 7 and 8, and move the pawl 49 inwardly of the margin of the opening 9 (or 10) in the panel 5. Thereupon, the assembly 11 is locked by the pawl against endwise movement and secured in its operative relationship with respect to the dough-sheeting rollers 7 and 8.

When it is desired to remove a scraper assembly 11 for cleaning, repair or replacement, the spreader bar 22 is shifted to spread the adjacent ends of the rocker arms 18 and 19 against the action of the spring 20. This action rotates the scraper shafts 14 and 15 sufficiently to retract the scrapers 16 and 17 from the rollers 7 and 8 and the pawl 49 from engagement with the opening margin of the panel 5. Thereupon the assembly may be withdrawn axially or endwise through the panel opening 9 (or 10) as indicated in Fig. 1.

The main advantages of this invention reside in the simple construction and arrangement of the scraper assembly, as a single operating unit, whereby the device can be readily removed from or inserted into the roller frame without the need for manipulating fastening bolts or screws; and in the arrangement of the scraper assembly whereby, when it is removed from the machine, the scraper blades and other parts are fully exposed for cleaning purposes.

Other advantages are found in the fact that removal of the scraper assembly as a complete operative unit leaves the interior of the sheeter and the rollers thereof fully exposed and accessible for cleaning, thereby materially shortening the time required for cleaning the machine and lessening the labor involved; and in the fact that the unitary scraper assembly permits easy and rapid replacement or repair of the scraper blades whenever that may be required.

Although but one specific embodiment of this invention is herein shown and described it will be understood that details of the construction shown may be altered or omitted without departing from the spirit of this invention as defined by the following claims.

I claim:

1. A dough-sheeting machine and removable scraper assembly, the machine comprising a pair of spaced support panels and a pair of parallel sheeting rollers extending between and journaled on the panels, and the scraper assembly comprising a pair of end plates connected together in fixed spaced relationship substantially equal to the spacing of the panels, a pair of shafts disposed parallel with said rollers and rotatively journaled on the plates, a scraper blade fixed lengthwise to each of the shafts and positioned for edgewise contact with a respective one of the sheeting rollers, spring-actuated means normally urging the shafts rotatively to press the scraper blades into contact with the respective rollers, and manually-actuatable means for turning said shafts against the action of said spring-actuated means and holding said blades disengaged from said rollers; and means on each of said support panels for engaging a respective end plate to support the scraper assembly between the panels.

2. A dough-sheeting machine and removable scraper assembly, the machine comprising a pair of spaced support panels and a pair of parallel sheeting rollers extending between and journaled on the panels, one of the panels having an opening therein adjacent the roller ends; and the scraper assembly comprising a pair of end plates one of which is smaller and the other of which is larger than the panel opening, means connecting said end plates together in fixed spaced relationship substantially equal to the spacing of the panels, a pair of shafts rotatively journaled on said plates parallel with said sheeting rollers, a scraper blade fixed to each of the shafts longitudinally thereof and positioned for edgewise contact with a respective one of the sheeting rollers, spring-actuated means normally urging the shafts rotatively to press the scraper blades into contact with the respective rollers, manually-actuatable means for retracting the spring-actuated means and holding said blades in a position disengaged from said rollers; and slidably coacting means on the said panels and the respective end plates for operatively suspending the scraper assembly between the panels when the said assembly is inserted lengthwise and small end first through the said one panel opening.

3. In a dough-sheeting machine having a pair of spaced parallel wall panels and a pair of parallel sheeting rollers extending between and journaled on the said panels, one of the panels having an opening therethrough adjacent the roller ends, a removable scraper assembly mounted parallel with said rollers and comprising a pair of end plates one of which is smaller than the panel opening, and the other of which is larger than the panel opening, means extending between and connecting said end plates in fixed spaced relationship substantially equal to the spacing of the panels, a pair of parallel shafts rotatively journaled on and between said end plates; a scraper blade fixed to each of the shafts in axially parallel relation therewith for edgewise contact with a respective one of the sheeting rollers, spring-actuated means normally urging the shafts rotatively to press the scrapers into contact with the respective rollers, manually-actuatable means for turning said shafts against the action of the spring-actuated means to retract said blades from the rollers and within the longitudinally projected area of said opening, means for holding said blades in retracted position, and coacting pin and socket means on said wall panels and the respective end plates for holding said scraper assembly in operative position between said wall panels when the said assembly is inserted lengthwise and small end plate first through the said one panel opening.

4. A removable scraper assembly for mutually coacting dough rollers, comprising a pair of end plates, means connecting said end plates in fixed spaced parallel relationship, a pair of shafts rotatively journaled on the plates and extending therebetween parallel with each other, a scraper blade fixed to each of the shafts and projecting laterally therefrom, a rocker arm fixed transversely to each of the scraper shafts, resilient means interposed between the rocker arms to normally urge the shafts rotatively in opposite directions, manually operable means for shifting and holding the rocker arms against the action of the said resilient means to maintain the scraper blades at an inoperative position, and means for removably mounting the scraper assembly in operative relation with a pair of parallel mutually coacting dough rollers.

5. In a dough-sheeting machine having a pair of spaced parallel wall panels and a pair of parallel sheeting rollers extending between and journaled on the said panels, one of the wall panels having an opening therethrough adjacent the roller ends, a removable scraper assembly comprising a pair of end plates, one of which is smaller than the said panel opening and the other of which is larger than said opening, means connecting said end plates in fixed relationship spaced apart a distance substantially equal to the spacing of the said wall panels, a pair of shafts extending between and rotatively journaled on the end plates, a scraper fixed to each of the shafts and extending longitudinally thereof, each of said scrapers projecting laterally from its shaft to contact a respective one of the sheeting rollers, a rocker arm fixed to each of the scraper shafts transversely thereof and on the outerside of the larger of said end plates, a spring interposed between the rocker arms to normally urge the shafts rotatively to press the scrapers into contact with the respective rollers, manually shiftable means for engaging and operating the rocker arms to rotate said shafts against the action of said spring and hold the scrapers in a position retracted from contact with the rollers and wholly within the projected area of said wall panel opening, whereby the scraper assembly may be removed from and replaced on the machine by endwise movement of the assembly through the said wall panel opening, means for slidably supporting said assembly between said wall panels, and a pawl fixed to one of the scraper shafts and projecting radially therefrom to engage the inner margin of the panel opening when the rocker arms are released and thereby lock the scraper assembly against endwise outward movement from said wall panel opening.

6. In a dough-sheeting machine having a pair of laterally spaced support panels and a pair of parallel mutually coacting sheeting rollers extending between and journaled on the said panels, a removable scraper assembly mounted between said support panels in operative relation with said rollers and comprising a pair of end plates rigidly connected together in fixed spaced relationship substantially equal to the spacing of the support panels, a pair of shafts extending between and journaled on said end plates, a scraper fixed to each of the shafts and projecting laterally therefrom to contact a respective one of the sheeting rollers, a rocker arm fixed to the end of each of the scraper shafts adjacent one of the end plates and extending transversely on opposite sides of the respective shaft, a spring interposed between the ends of the rocker arms on one side of the shafts to normally urge the shafts rotatively to press the scrapers into contact with the respective rollers, a bar pivoted on the said one end plate intermediate the opposite ends of the rocker arms and manually shiftable into and out of position to swing the rocker arms against the action of the spring and hold the said scrapers retracted from contact with the rollers for removal of the scraper assembly from and replacement on the support panels, and means for removably suspending the scraper assembly in operative position on the support panels.

7. In a dough-sheeting machine having a pair of laterally spaced support panels and a pair of parallel sheeting rollers extending between and journaled on the support panels, one of the said panels having an opening therethrough adjacent the roller ends, a scraper assembly comprising a pair of end plates one of which is smaller and the other of which is larger than the said panel opening, means connecting said end plates in fixed spaced relationship substantially equal to the spacing of the panels, a pair of shafts extending between and journaled on said end plates, a scraper blade fixed on each of the shafts to contact the periphery of a respective one of the sheeting rollers, a plurality of outwardly projecting pins on the outer face of the one support panel adjacent the said opening, a plurality of pins projecting inwardly from the inner face of the other support panel within the projected area of said opening, the assembly end plates having apertures located for the reception of the respective pins to operatively position the scraper assembly on the support panels when the assembly is inserted endwise through the one panel opening, a rocker arm fixed transversely on the end of each of the scraper shafts on the outer side of the larger plate and extending on opposite sides of the respective shafts, a spring interposed between the ends of the rocker arms on one side of the shafts to normally urge the shafts rotatively to press the scrapers into contact with the respective rollers, a bar pivoted on the larger plate intermediate the opposite ends of the rocker arms and manually shiftable into and out of position to swing the rocker arms against the action of the spring and hold the scrapers in retracted position out of contact with the rollers and within the projected area of said panel opening, whereby removal of the scraper assembly from and replacement of the assembly on the support panels may be had by endwise movement of the assembly through said one panel opening, and a pawl fixed to one of the scraper shafts and projecting radially therefrom to engage the inner margin of the said panel opening when the said bar is shifted to release the rocker arms and thereby lock the scraper assembly in operative position on the support panels.

References Cited in the file of this patent

UNITED STATES PATENTS

| | | |
|---|---|---|
| 697,663 | Rosborough | Apr. 15, 1902 |
| 1,650,758 | Kuhla | Nov. 29, 1927 |
| 2,192,918 | Kohler | Mar. 12, 1940 |
| 2,746,401 | Archer | May 22, 1956 |
| 2,784,683 | Curtis et al. | Mar. 12, 1957 |